Nov. 15, 1960 W. B. WESTCOTT, JR 2,960,289
AIRCRAFT LANDING GEAR
Filed July 7, 1958 2 Sheets-Sheet 1

INVENTOR.
WILLIAM B. WESTCOTT, JR.
BY

*ATTORNEY*

Nov. 15, 1960    W. B. WESTCOTT, JR    2,960,289
AIRCRAFT LANDING GEAR
Filed July 7, 1958    2 Sheets-Sheet 2

INVENTOR.
WILLIAM B. WESTCOTT, JR.
BY
ATTORNEY

United States Patent Office 2,960,289
Patented Nov. 15, 1960

2,960,289
AIRCRAFT LANDING GEAR

William B. Westcott, Jr., Cleveland Heights, Ohio, assignor to Cleveland Pneumatic Industries, Inc., Cleveland, Ohio, a corporation of Ohio Filed July 7, 1958, Ser. No. 746,963

2 Claims. (Cl. 244—104)

This invention relates generally to landing gears and more particularly to a new and improved lightweight landing gear structure.

It is an important object of this invention to provide a new and improved landing gear structure utilizing a lightweight shock absorber in combination with a separate strut column.

It is another important object of this invention to provide a landing gear wherein the shock absorbing and structural elements are separated so that each can be designed with the maximum efficiency for its particular function.

It is still another important object of this invention to provide a tandem wheeled landing gear having separate axle beams pivoted for rotation on a strut in combination with resilient means connected between the axle beams biasing them in a direction tending to move the wheels downward relative to the strut.

It is still another object of this invention to provide a tandem landing gear utilizing a liquid spring connected between separate axle beams pivoted on the strut.

Further objects and advantages will appear from the following description and drawings, wherein.

In landing gears, it is customary to provide a shock absorbing strut which includes two telescoping members co-operating to form a fluid spring which resiliently supports the weight of the aircraft on the ground and provides damping means to absorb the impacts of landing. In such structures, it is necessary to design the telescoping members so that they are able to withstand the pressure loads of the shock absorber and the column loads on the strut. Since the strut must perform these two major functions, the normal design of each strut is a compromise insofar as each function is concerned. In a landing gear according to this invention, however, the functions of the various elements are separated so that each element may be designed to its optimum size and shape to perform its single function. In addition, since telescoping members are not provided, it is not necessary to use torque arms to connect the two telescoping members and prevent relative rotation therebetween.

Figure 1:
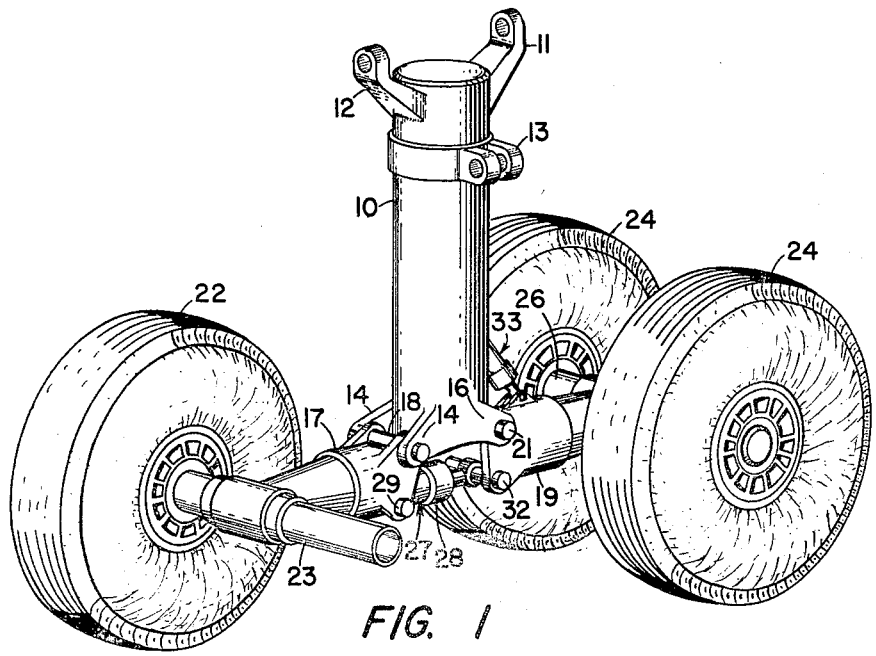
Figure 1 is a perspective view with parts removed of a dual tandem landing gear incorporating this invention.

Referring to the drawings. In Figure 1, a typical dual tandem landing gear is shown which incorporates this invention. This landing gear includes a tubular main strut 10 provided with mounting lugs 11, 12, and 13 by which it is connected to the frame of an aircraft. The main strut 10 is formed with a pair of forward mounting lugs 14 and a similar pair of rearward mounting lugs 16. A forward axle beam 17 is pivotally connected to the forward mounting lugs 14 by a pivot pin 18. Similarly, a rearward axle beam 19 is pivotally connected to the rearward mounting lug 16 by a pivot pin 21. The various elements are arranged so that both axle beams can rotate relative to the strut 10 in the same vertical plane. A pair of forward landing wheels 22, one of which is removed in Figure 1, are mounted on either side of the forward axle beam 17 on an axle 23. Similarly, a pair of rearward landing wheels 24 are mounted on opposite sides of the rearward axle beam 19 on an axle 26.

Figure 2:
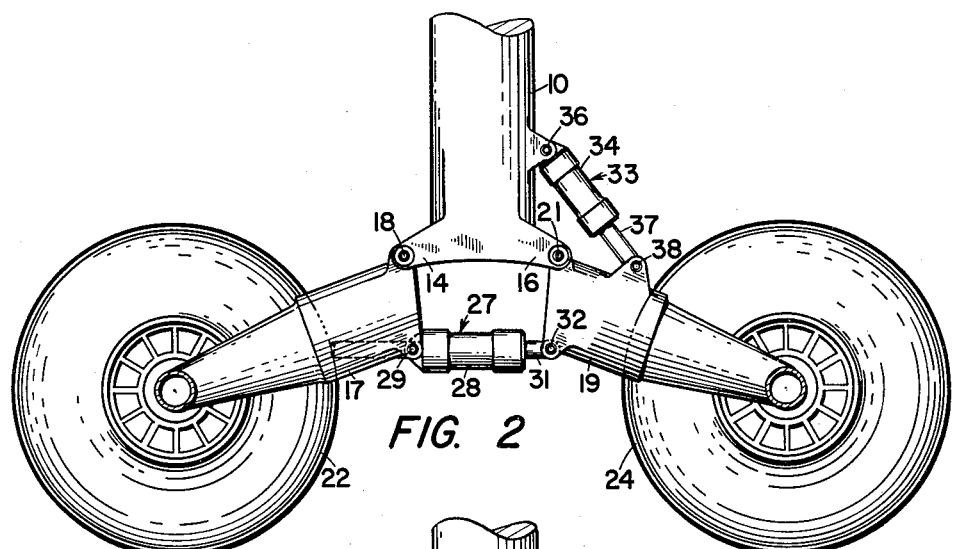
Figure 2 is a fragmentary side elevation showing the landing gear elements in the extended position which they assume when the aircraft is air-borne.
Figure 3:
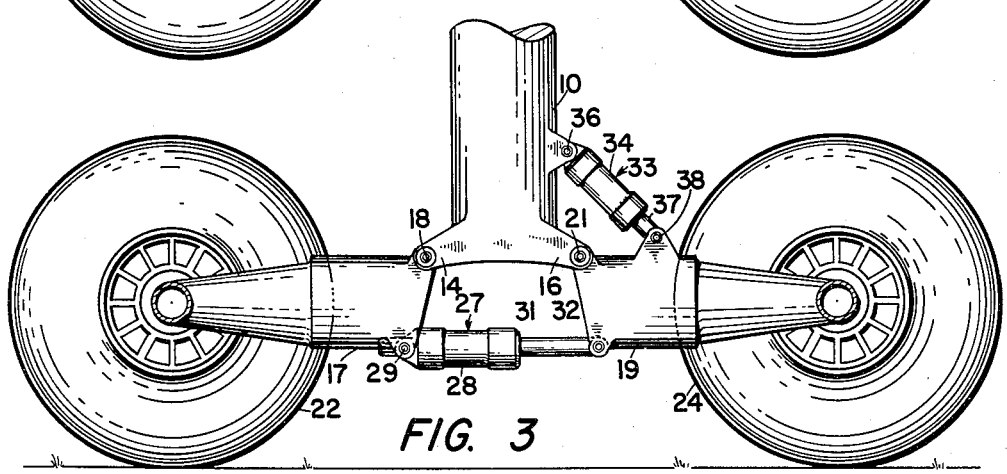
Figure 3 is a view similar to Figure 2 showing the position the elements assume in the static position when they are supporting the weight of the aircraft on the ground.
Figure 4:
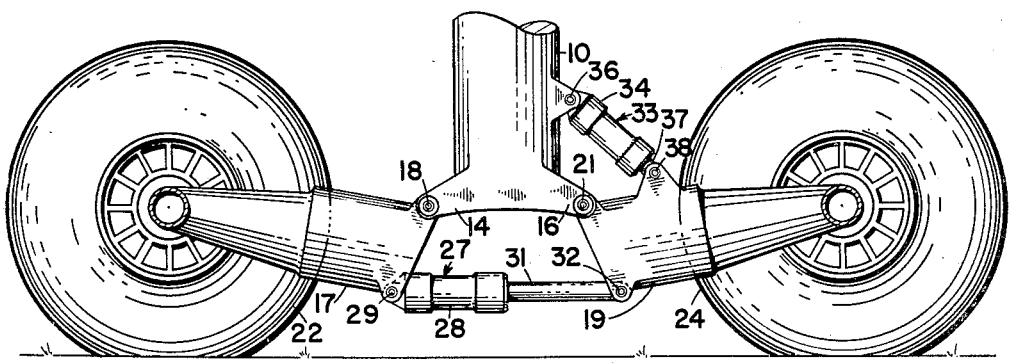
Figure 4 is a view similar to Figures 2 and 3 showing the position the elements assume when the landing gear is in the fully compressed position which occurs only on landing impact.

Referring now to Figures 2 through 4. When the aircraft is airborne and the wheels 22 and 24 are clear of the ground, the axle beams 17 and 19 rotate around their respective pivot pins 18 and 21 until they reach the extended position of Figure 2. When the aircraft is resiliently supported on the ground by the landing wheels 22 and 24, the two axle beams 17 and 19 rotate from the extended position of Figure 2 so that the wheels 22 and 24 move upwardly relative to the strut 10 to the position of Figure 3. At the initial impact of the wheels with the ground, the elements can move to the fully compressed position of Figure 4 wherein the axle beams 17 and 19 have rotated around their respective pivot pins to a position wherein the strut 10 is in its lower most position relative to the wheels 22 and 24 which is the fully compressed position.

In order to resiliently resist relative rotation between the axle beams and the strut 10 in directions which cause the wheels 22 and 24 to move upward relative to the strut 10, a tension liquid spring 27 is provided. This liquid spring includes a cylinder 28 pivotally connected to the axle beam 17 by aligned pivot pins 29 and a plunger 31 pivotally connected to the axle beam 19 by a pivot pin 32. The tension liquid spring 27 is arranged so that the plunger 31 is resiliently urged to the left relative to the cylinder 28 tending to move the pivot pins 29 and 32 toward each other. This in turn produces a torque tending to rotate the forward axle beam 17 in a counterclockwise direction around the pivot pin 18 and the rearward axle beam 19 in a clockwise direction around the pivot pin 21. Such rotation, of course, tends to move the strut 10 upwardly relative to the wheels 22 and 24 or move the wheels downwardly relative to the strut 10 depending upon which way the system is considered. As the strut 10 moves downwardly relative to the wheels 22 and 24, it produces clockwise rotation of the forward axle beam 17 around its pivot and counterclockwise rotation of the rearward axle beam 19 around its pivot and causes the pivot pins 29 and 32 to move further apart. This, of course, moves the plunger 31 out along the cylinder 28 which action is resisted by the spring as will be described below. A liquid spring is highly desirable in this particular installation because extremely large spring forces are available with relatively small spring structures. However, it should be understood that other types of spring or shock absorbing could be provided so long as they provide sufficient force levels.

When the aircraft is air-borne, it is necessary to insure that the two axle beams 17 and 19 will assume a predetermined position relative to the strut 10. To accomplish this, an air spring or bungee 33 is utilized which includes a cylinder 34 pivoted on the strut 10 by a pivot pin 36 and a piston 37 pivoted on the rearward axle beam 19 by a pivot pin 38. The air spring 33 is sized so that it will bottom and insure that the piston 37 is in its extended position shown in Figure 2 whenever the aircraft is air-borne and the wheel 24 is out of contact with the ground. Therefore, the rearward axle beam will automatically move to the position shown in Figure 2 and be maintained in this rotational position relative to the strut 10 when the aircraft is air-borne. The liquid spring 27 is also proportioned to bottom in the fully extended position shown in Figure 2 whenever the aircraft is air-borne so it will automatically move the two pivot pins 29 and 32 to the predetermined distance apart shown in Figure 2. Since the rearward axle beam 19 is in a fixed position relative to the strut 10 at this time and since the two pivot pins 29 and 32 are maintained at a predetermined distance apart, then the forward axle beam will be maintained in the position shown in Figure 2. The force of the air spring 33 is such that as soon as the wheel 24 engages the ground, the reaction force on the wheel 24 will overcome the action of the air spring 33 and its force will be insignificant.

Figure 5:
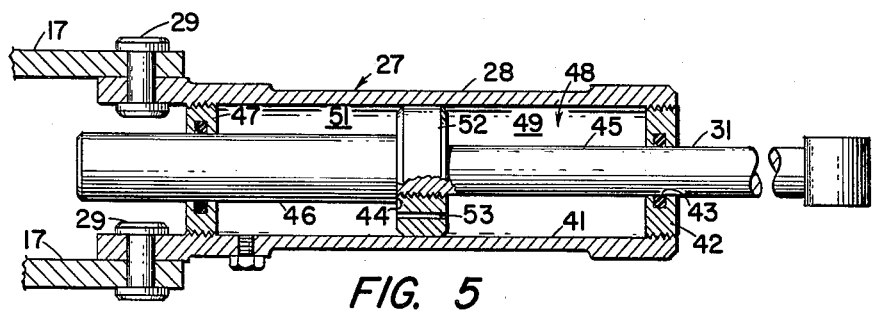
Figure 5 is an enlarged longitudinal section of the tension liquid spring used to resiliently support the weight of the aircraft; and, Figure 6 is a longitudinal section of the bungee air spring used to stabilize the axle beams when the aircraft is air-borne.

Referring now to Figure 5; the cylinder 28 of the liquid spring 27 is formed as a hollow tube having an inner wall 41 in the right end of which is mounted a gland member 42. The gland member 42 is formed with a central aperture 43 through which projects a first portion 45 of the plunger 31. This first portion 45 has a uniform diameter which extends to a shoulder 44. To the left of the shoulder 44 is a second portion 46 of the plunger 31 having a uniform larger diameter than the first portion 45 which extends through a second gland 47 threaded into the left end of the cylinder 27. Although the glands 42 and 47 have been shown with schematic seals which provide sealing engagement with the plunger 31, the seal itself is normally formed according to the structure disclosed and claimed in the co-pending application of Arthur L. Lindow and Richard A. Graff, Serial No. 597,692, filed July 13, 1956.

The cylinder 28, the two glands 42 and 47, and the plunger 31 co-operate to define a liquid filled cavity 48 which is divided into first and second chambers 49 and 51 by a piston head 52 threaded onto the plunger 31 against the shoulder 44. Because the second portion 46 has a larger diameter than the first portion 45, movement of the plunger 31 to the right reduces the total volume of the two chambers 49 and 51 and compresses the liquid contained therein. This is due to the fact that movement through a given distance of the plunger increases the displacement of the second portion 46 by an amount equal to the cross-sectional area of the second portion 46 times the distance of movement while at the same time the displacement of the first portion 45 is decreased by an amount equal to the cross-sectional area of the first portion 45 times its axial movement. Since both portions move the same amount and since the cross-sectional area of the second portion 46 is greater than the cross-sectional area of the first portion 45, movement of the plunger 31 to the right reduces the total volume of the two chambers 49 and 51 by an amount equal to the differential area between the two portions 45 and 46 times the axial movement. As the plunger 31 moves to the right and increases its displacement within the two chambers 49 and 51, it compresses the liquid to a higher pressure and increases the reaction force of the liquid on the plunger 31 urging it to the left. The liquid spring 27 is arranged so that when the landing gear is in the extended position of Figure 2, the piston head 52 seats against the gland 47 and the liquid within the spring is at a predetermined precharge pressure.

The piston head 52 extends into engagement with the wall 41 so movement of the plunger 31 to the right quickly reduces the volume of the chamber 49 and causes the volume of the chamber 51 to increase. Because the piston head 52 has a substantially larger area than the plungers, the pressure differential caused by movement of the piston head to the right acts on the larger area of the piston head and resists movement in this direction. The piston head 52 is formed with an orifice bore 53 which provides a restricted connection between the two chambers 49 and 51 so that movement of the piston head creates flow through the orifice and the usual damping action. Therefore, the spring action resiliently urges the plunger 31 in the left-hand position and the damping action resists movement of the plunger in both directions. Because the second portion 46 projects out of the left end of the cylinder 28, the pivot pin 29 is actually formed of two aligned sections having the portion 46 of the plunger 31 slidable therebetween as shown in Figure 5 and the forward axle beam 17 is cut out on its lower side to clear the second portion 46.

Figure 6:
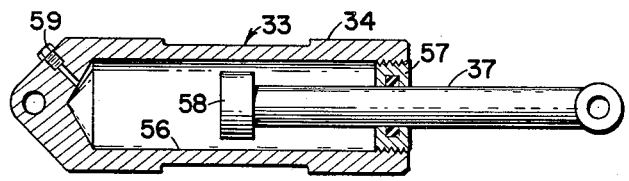

The bungee or air spring 33 shown in Figure 6 includes the cylinder 34 formed with a bore 56 into which projects the piston 37. A gland 57 is threaded into the open end of the bore 56 and provides sealing engagement with the piston 37. The left end of the piston 37 is formed with a head 58 which engages the gland 57 when the spring is in the fully extended position but since damping is not necessary in this spring, the head 58 does not extend into engagement with the bore 56. This spring is filled with air under pressure through a charging fitting 59 and this air acts on the piston 37 to resiliently urge it to the right toward its fully extended position.

A landing gear according to this invention has a number of advantages, most of which result in weight savings in the landing gear. First, the strut 10 is formed of the proper diameter and wall thickness to ideally carry the column loads on the strut. Because the strut 10 performs only one function, it can be designed to its optimum size and section so that it will have a minimum weight. In addition, because the axle beams 17 and 19 are pivotally connected for movement in a single plane, torque arms are not needed. Still further, weight savings result from the use of a liquid spring which is much lighter and less expensive than conventional air springs for a given load carrying capacity. Because the liquid spring 27 is connected between the two axle beams, the loads on the wheels will always be equalized regardless of the landing attitude of the aircraft. In the illustrated embodiment, the two axle beams 17 and 19 are pivoted at spaced points on the strut 10 but in some cases, they are pivoted on the same pivot axis. In addition, when a compression liquid spring is used, the spring pivotal connections on the axle beams are above the connections of the axle beam on the strut. In such cases and in the illustrated embodiment, however, each device performs its function in an optimum manner and can be sized to give the lightest weight for the given function.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

I claim:

1. An aircraft landing gear comprising a strut, a laterally extending first axle beam pivotally connected to one end of said strut for rotation relative thereto in a vertical plane from an extended position, a second axle beam pivotally connected to said one end of said strut for rotation relative thereto in said vertical plane from an extended position and projecting from said strut in a direction opposite to said first axle beam, a ground engaging element on each axle beam, a compression spring connected between said first axle beam and said strut biasing said first axle beam to its extended position, a tension liquid spring having a pair of telescoping members axially movable relative to each other from a compressed position to an extended position, a first pivot connecting one of said members to said first axle beam below the connection of said first axle beam and said strut, and a second pivot connecting the other of said members to said second axle beam to a point below the connection of said second axle beam and said strut, said liquid spring being in its compressed position when said axle beams are both in their extended positions.

2. An aircraft landing gear comprising a strut, a laterally extending first axle beam pivotally connected to one end of said strut for rotation relative thereto in a vertical plane from an extended position, a second axle beam pivotally connected to said one end of said strut for rotation relative thereto in said vertical plane from an extended position and projecting from said strut in a direction opposite to said first axle beam, a ground engaging element on each axle beam, a compression spring having a position of maximum extension connected between said first axle beam and said strut, said compression spring being in its maximum extended position when said first axle beam is in its extended position, a tension liquid spring having a pair of telescoping members axially movable relative to each other from a compressed position to an extended position, a first pivot connecting one of said members to said first axle beam below the connection of said first axle beam and said strut, and a second pivot connecting the other of said members to said second axle beam to a point below the connection of said second axle beam and said strut, said liquid spring being in its compressed position when said axle beams are both in their extended positions.

References Cited in the file of this patent

UNITED STATES PATENTS

| | | |
|---|---|---|
| 2,130,914 | Warren | Sept. 20, 1938 |
| 2,386,620 | Loyd | Oct. 9, 1945 |
| 2,578,200 | Nicholl | Dec. 11, 1951 |

FOREIGN PATENTS

| | | |
|---|---|---|
| 86,289 | Germany | Apr. 9, 1896 |
| 168,692 | Great Britain | Sept. 14, 1921 |
| 562,435 | France | Sept. 5, 1923 |